United States Patent [19]

Kushita

[11] Patent Number: 5,444,672
[45] Date of Patent: Aug. 22, 1995

[54] TIME-KEEPING RADIO DISPLAY PAGER PRECISELY CALIBRATED TO LOCAL STANDARD TIME

[75] Inventor: Masayuki Kushita, Tokyo, Japan

[73] Assignee: NEC Corporation, Tokyo, Japan

[21] Appl. No.: 219,463

[22] Filed: Mar. 29, 1994

[30] Foreign Application Priority Data

Mar. 29, 1993 [JP] Japan .................................. 5-070068

[51] Int. Cl.[6] .............................................. G04G 7/02
[52] U.S. Cl. ........................................ 368/47; 368/10
[58] Field of Search .................................. 368/45–56, 368/10

[56] References Cited

U.S. PATENT DOCUMENTS 3,684,964 8/1972 Bright et al. ........................... 325/58
4,440,501 4/1984 Schulz .................................. 368/47

FOREIGN PATENT DOCUMENTS 0461849 12/1991 European Pat. Off. .
61-92045 5/1986 Japan .

Primary Examiner—Bernard Roskoski
Attorney, Agent, or Firm—Sughrue, Mion, Zinn, Macpeak & Seas

[57] ABSTRACT

A radio display pager receives a series of frames from a paging station synchronized to the seconds of the local standard time. Each frame contains a frame synchronizing signal and a frame position signal indicating the position of the frame within the series, each of the frames being synchronized with a local standard time of the paging station. A frame counter increments a count value in synchronism with the reception of each frame synchronizing signal and produces an output when the count value reaches a predetermined value. The frame counter is reset to an initial value in response to the reception of a predetermined frame position signal which occurs at 1-minute intervals. A time-keeping circuit counts locally generated clock pulses to display the time of day on a display unit. The time-keeping circuit is responsive to the output of the frame counter for calibrating the time of day to the local standard time.

9 Claims, 2 Drawing Sheets

TIME-KEEPING RADIO DISPLAY PAGER PRECISELY CALIBRATED TO LOCAL STANDARD TIME

BACKGROUND OF THE INVENTION

1. Field of the invention

The present invention relates generally to radio display pagers, and more specifically to a radio display pager having a time-keeping circuit for displaying time of day.

2. Description of the Related Art

A prior art radio display pager, as shown and described in Japanese Patent Provisional Publication (Tokkaisho) 61-92045, receives a paging signal which contains a time-of-day signal in addition to source and destination user addresses and a message. The time-of-day signal indicates the "minutes" and "hours" of the local standard time. The pager includes a time-keeping logic circuit which is calibrated by the received time-of-day signal to produce and display the minute and hour of the local time on a display unit. To constantly display the time of day even when the pager is turned off or located in a place where paging signals cannot be received, the time-keeping logic circuit is driven by clock pulses generated by a local oscillator. Since the local oscillator is not precisely synchronized to the "seconds" of the standard time, the displayed time of day develops a significant amount of deviation from the standard time if the logic circuit is not calibrated for a long period of time.

SUMMARY OF THE INVENTION it is therefore an object of the present invention to provide a high-precision radio display pager having a time-keeping circuit which is reset to the local standard time of a paging station.

According to the present invention, there is provided a radio display pager which receives a series of frames each containing a frame synchronizing signal indicating arrival of the frame and a frame position signal indicating the position of the frame within the series, each of the frames being synchronized with a local standard time of the paging station. A frame counter is provided for incrementing a count value in synchronism with the reception of each frame synchronizing signal and producing an output signal when the count value reaches a predetermined value. The frame counter is reset to an initial value in response to the reception of a predetermined frame position signal. A time-keeping circuit counts locally generated clock pulses to display the time of day on a display unit. The time-keeping circuit is responsive to the output signal of the frame counter for calibrating the time of day to the local standard time. Preferably, the predetermined frame position signal is received at 1-minute intervals.

BRIEF DESCRIPTION OF THE DRAWINGS.

The present invention will be described in further detail with reference to the accompanying drawings, in which.

DETAILED DESCRIPTION

Figure 1:
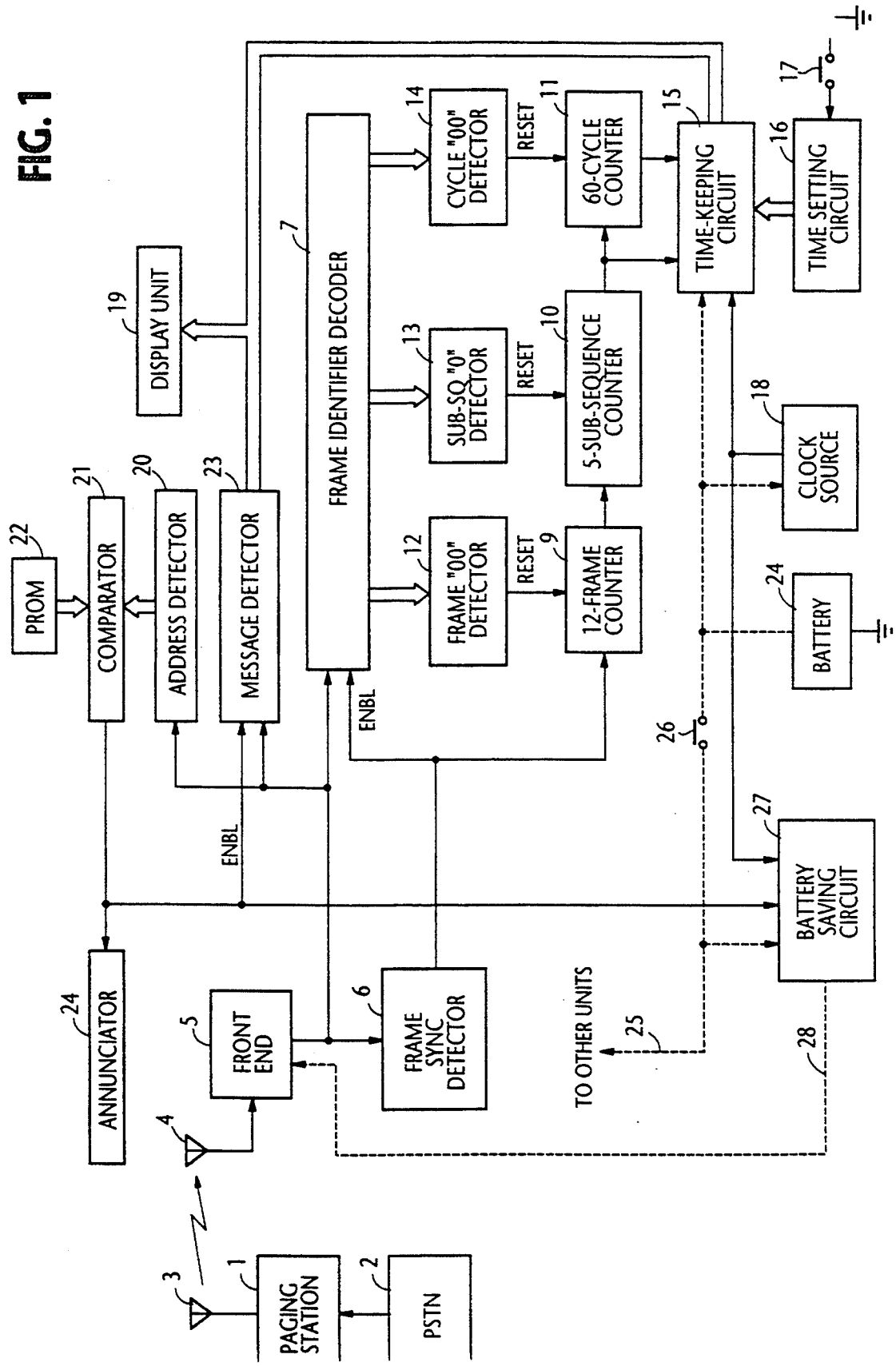
FIG. 1 is a block diagram of a paging communication system according to the present invention.
Figure 2:
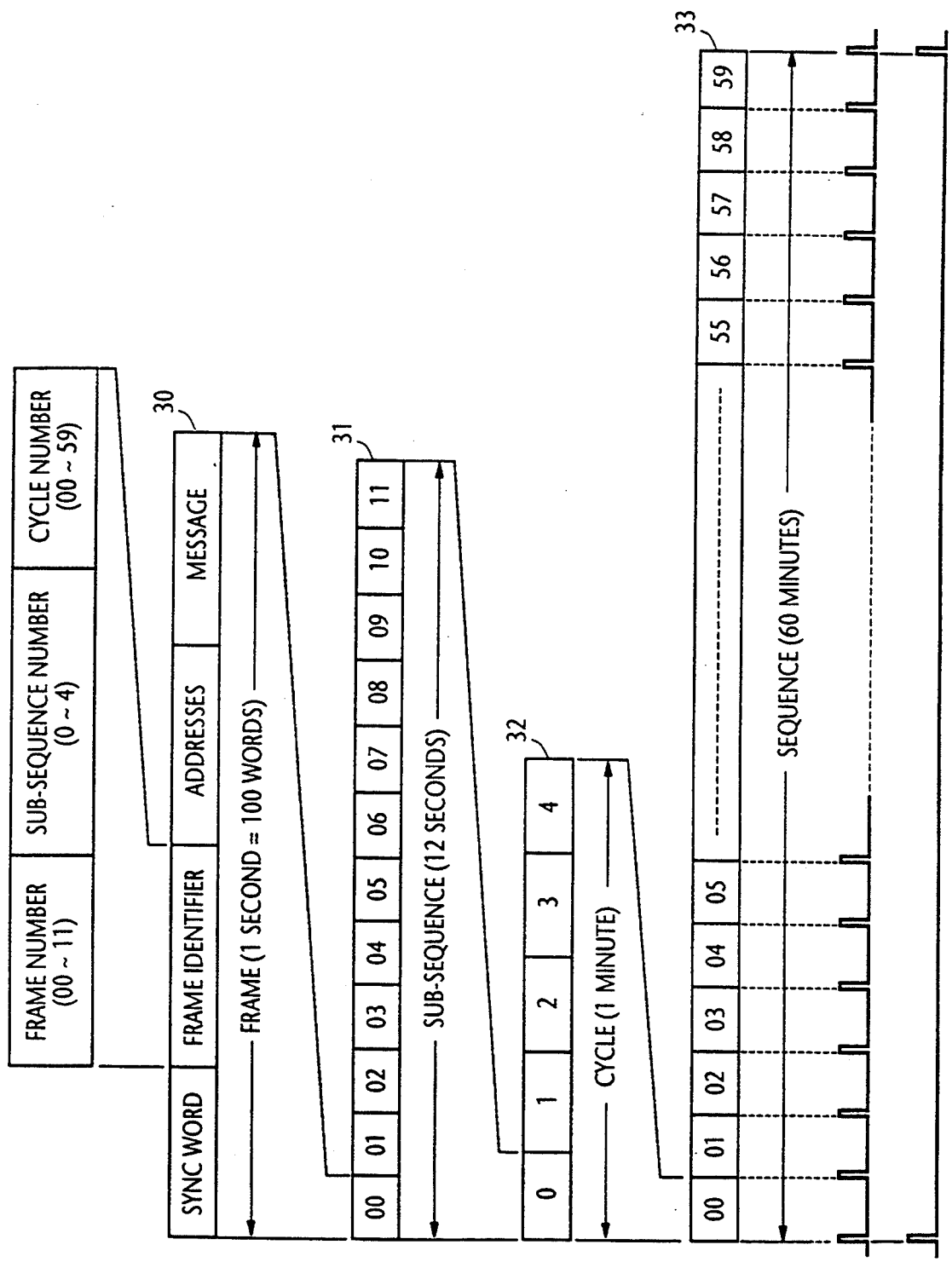
FIG. 2 is an illustration of the structure of frame signals transmitted from a paging station and timing pulses generated by "minute" and "hour" counters, respectively.

Referring now to FIG. 1, there is shown a radio paging communication system according to the present invention, A paging station 1 is connected to a public switched telephone network 2 to receive a calling signal including the telephone numbers of a calling network user and a called paging user and a message, In response, the paging station multiplexes the received telephone numbers and message with a frame sync word and a frame identifier to form a frame signal of 1-second duration as indicated by numeral 30 in FIG. 2. After conversion to a digital signal of a prescribed line code format, such as BCH format, the frame signal is modulated onto a carrier and broadcast from antenna 3.

Each frame contains 100 words of data bits and is represented by one of serial numbers "00" to "11". Frame signals "00" to "11" comprise a sub-sequence 31 of 12-second duration. Sub-sequence signals numbered "0" to "4" comprise a cycle 32 of 1-minute duration. A series of cycles numbered "00" to "59" forms a sequence 33 of 60-minute duration. The frame identifier of each frame 30 contains a cycle number, a sub-sequence number and a frame number for identifying the position of the frame within each sequence 33. In this way, the timing of each frame is precisely synchronized to the local standard time of the paging station.

At the pager, the transmitted signal is received by antenna 4 and demodulated by a front end S into the coded baseband signal and applied to a frame sync detector 6 which produces an output when it detects a frame sync word contained at the beginning of a frame signal. The output of frame sync detector 6 is applied to a frame identifier decoder 7 and to a frame counter circuit comprising a series of a 12-frame counter 9, a 5-sub-sequence counter 10 and a 60-cycle counter 11. Frame identifier decoder 7 is enabled in response to the output of frame sync detector 6 to start decoding the frame identifier of the received frame signal to detect the frame number (00~11), sub-sequence number (0~4) and cycle number (00~59) of the received frame, Frame identifier decoder 7 supplies these numbers to a frame "00" detector 12, a sub-sequence "0" detector 13, and a cycle "00" detector 14, respectively. Frame "00" detector 12 produces an output when it detects a frame having frame number "00", sub-sequence "0" detector 1:3 produces an output when it detects a frame having sub-sequence number "0", and cycle "00" detector 14 produces an output when it detects a frame having cycle number "00".

The output of frame sync detector 6 is applied to the 12-frame counter 9 to increment its count in response to each frame synchronizing pulse and produces an output pulse as it reaches a full count of twelve frames. The counter 9 is reset to a predetermined initial value in response to the output of frame "00" detector 12. The 12-frame counter 9 thus produces an output at 12-second intervals precisely if it is reset by frame "00" detector 12.

The output of counter 9 is fed into the 5-sub-sequence counter 10 which, in response, increments its count and produces an output as it attains a full count of five input pulses from counter 9, which corresponds to five sub-sequences. The 5-sub-sequence counter 10 is reset to a predetermined initial value in response to the output of sub-sequence "0" detector 13. In like manner, the output of counter 10 is applied to the 60-cycle counter 11 which, in response, increments its count and produces an output as It attains a full count of sixty input pulses from counter 10, which corresponds to sixty cycles. The 60-cycle counter 11 is reset to a predetermined initial value in response to the output of cycle "00" detector 14. Therefore, the counters 10 and 11 are precisely adjusted to the "minute" and "hour" of the standard time of the paging station to the precision of 1 second if they are reset by the outputs of detectors 13 and 14, respectively, as illustrated in FIG. 2. The outputs of counters 10 and 11 are supplied to the time-keeping circuit 15 as reset pulses to calibrate the time-of-day data to the "minutes" and "hours" of the standard time of the paging station.

A time-keeping circuit 15 is driven by the clock source 18 to keep time of day which is displayed on a display unit 19. A time setting circuit 16 is connected to the time-keeping circuit 15 to manually adjust the time-keeping circuit by operation of a manual switch 17 with the time-of-day data being displayed on the display unit 19.

An address detector 20 is connected to the output of front end 5 to detect the destination address contained in the received frame signal. The detected destination address is matched by a comparator 21 against the address of the pager stored in a programmable read-only memory 20. If there is a match between them, comparator 21 enables a message detector 23, connected to the output of front end 5, to detect a message contained in the frame signal and activates an annunciator 23 to alert the owner of the pager of the arrival of a message. The address of the calling network user and the message are then displayed on the display unit 19 when the owner answers the call.

The time-keeping circuit 15 and clock source 18 are permanently activated with power supplied from a battery 24, and all units of the pager other than front end 5, time-keeping circuit 15 and clock source 18 are activated with power supplied through line 25 via a power switch 26. For battery saving and signal monitoring purposes during a standby mode, the pager includes a battery saving circuit 27 which intermittently supplies the battery voltage to the front end 5 through line 28. When the pager is called, the battery saving circuit 27 is disabled in response to the output of comparator 21 in order to continuously supply the battery voltage to the front end 5.

It will be seen that when the power supply to front end 5 is cut off during the standby mode or power switch 26 is turned off, all counters 9, 10 and 11 cease their count operation and no resetting operation is provided for the time-keeping circuit 15. When the front end 5 is activated again, a frame sync word is detected by the frame sync detector 6 and the 12-frame counter 9 starts counting the detected frame synchronizing signal. Since the counter 9 remains at the value which it attained at the end of the previous active mode, it may produce an output at incorrect timing. However, the counter 9 will be reset by an output of frame "00" detector 12 which is produced precisely in synchronism with the local standard time immediately following the turn-on of the front end 5. Therefore, the output timing of counter 9 is corrected to synchronize with the local standard time immediately following the start of its count operation. The timing error which has developed in the time-keeping circuit 15 during the turn-off time due to the inaccuracy of the clock source 18 is corrected in response to the outputs of counters 10 and 11 to the precision of 1 second.

The foregoing description shows only one preferred embodiment of the present invention. Various modifications are apparent to those skilled in the art without departing from the scope of the present invention which is only limited by the appended claims. For example, the length of each frame may differ from other frames depending on the contents of the frame. It is at least necessary that the frame signal be synchronized with the seconds of the local standard time and that the subsequence contains a fixed number of frames.

What is claimed is:

1. A radio display pager comprising:
   receiver means for receiving a paging signal from a paging station, said paging signal comprising a series of frames, each of the frames containing a frame synchronizing signal indicating arrival of the frame and a frame position signal indicating a position of the frame within said series, each of said frames being synchronized with a local standard time of said paging station;
   frame sync detector means connected to said receiver means for detecting a frame synchronizing signal from each frame of the received paging signal;
   frame position detector means connected to said receiver means for detecting a predetermined frame position signal from the received paging signal;
   counter means for incrementing a count value in synchronism with the detection of each frame synchronizing signal by said frame sync detector means and producing an output signal when said count value reaches a predetermined value, said counter means being reset to an initial value in response to the detection of the predetermined frame position signal by said frame position detector means;
   a clock source for continuously generating a local clock pulse;
   time-keeping means for counting said local clock pulse and generating therefrom a time-of-day signal, said time-keeping means being calibrated to the local standard time in response to the output signal of said counter means; and
   display means for displaying time of day indicated by said time-of-day signal.

2. A radio display pager as claimed in claim 1, wherein the frame position signal detected by said frame position detector means occurs at 1-minute intervals.

3. A radio display pager as claimed in claim 1, wherein said frame position detector means comprises means for detecting from the received paging signal a first frame position signal which occurs at 1-minute intervals and a second frame position signal which occurs at 60-minute intervals, wherein said counter means comprises:
   first counter means for incrementing a first count value in response to said frame synchronizing signal and producing an output signal when said first count value reaches a full count value, said first counter means being reset to an initial count value in response to said first frame position signal; and
   second counter means for incrementing a second count value in response to the output signal of said first counter means and producing an output signal when said second count value reaches a full count value, said second counter means being reset to an initial count value in response to said second frame position signal, said time-keeping means being calibrated to said local standard time in response to the output signals of said first and second counter means.

4. A radio display pager as claimed in claim 1, further comprising power saving means for intermittently deactivating said receiver means during a standby mode of said pager and continuously activating said receiver means when said paging signal is destined to the pager.

5. A radio paging system comprising:

a paging station for broadcasting a paging signal comprising a series of frames, each of the frames containing a frame synchronizing signal indicating arrival of the frame and a frame position signal indicating a position of the frame within said series, each of said frames being synchronized with a local standard time of said paging station; and a pager comprising:

receiver means for receiving the broadcast paging signal;

frame sync detector means connected to said receiver means for detecting a frame synchronizing signal from each frame of the received paging signal;

frame position detector means connected to said receiver means for detecting a predetermined frame position signal from the received paging signal;

a dock source for continuously generating a local clock pulse;

counter means for incrementing a count value in synchronism with the detection of each frame synchronizing signal by said frame sync detector means and producing an output signal when said count value reaches a predetermined value, said counter means being reset to an initial value in response to the detection of the predetermined frame position signal by said frame position detector means;

time-keeping means for counting said local clock pulse and generating therefrom a time-of-day signal, said time-keeping means being calibrated to the local standard time in response to the output signal of said counter means; and display means for displaying time of day indicated by said time-of-day signal.

6. A radio paging system as claimed in claim 5, wherein said paging station broadcasts said frame position signal at 1-minute intervals.

7. A radio paging system as claimed in claim 5, wherein said frame position detector means comprises means for detecting from the received paging signal a first frame position signal which occurs at 1-minute intervals and a second frame position signal which occurs at 60-minute intervals, wherein said counter means comprises:

first counter means for incrementing a first count value in response to said frame synchronizing signal and producing an output signal when said first count value reaches a full count value, said first counter means being reset to an initial count value in response to said first frame position signal; and second counter means for incrementing a second count value in response to the output signal of said first counter means and producing an output signal when said second count value reaches a full count value, said second counter means being reset to an initial count value in response to said second frame position signal, said time-keeping means being calibrated to said local standard time in response to the output signals of said first and second counter means.

8. A radio paging system as claimed in claim 5, wherein said pager further comprises power saving means for intermittently deactivating said receiver means during a standby mode of said pager and continuously activating said receiver means when said paging signal is destined to the pager.

9. In a radio display pager, a method comprising the steps of:

a) receiving a paging signal from a paging station, said paging signal comprising a series of frames, each of the frames containing a frame synchronizing signal indicating arrival of the frame and a frame position signal indicating a position of the frame within said series, each of said frames being synchronized with a local standard time of said paging station;

b) counting locally generated clock pulses to produce time data and displaying time of day indicated by the time data;

c) incrementing a count value in synchronism with the reception of a frame synchronizing signal by the step (a) and calibrating the time data to the local standard time when said count value reaches a predetermined value;

d) detecting a predetermined frame position signal from one of the frames of the received paging signal and, in response, resetting the count value to an initial value; and e) repeating the steps (c) and (d).

* * * * *

UNITED STATES PATENT AND TRADEMARK OFFICE
CERTIFICATE OF CORRECTION

PATENT NO. : 5,444,672
DATED : August 22, 1995
INVENTOR(S) : Masayuki KUSHITA

It is certified that error appears in the above-indentified patent and that said Letters Patent is hereby corrected as shown below:

Col. 1, line 34, delete "it" and insert --It--.

Col. 2, line 29, delete "S" and insert --5--.

Col. 2, line 47, delete "1:3" and insert --13--.

Col. 5, line 28, delete "dock" and insert --clock--.

Signed and Sealed this

Thirtieth Day of April, 1996

Attest:

BRUCE LEHMAN

*Attesting Officer*  *Commissioner of Patents and Trademarks*